United States Patent
Krahn

(10) Patent No.: US 8,397,858 B2
(45) Date of Patent: Mar. 19, 2013

(54) HYDRO-MECHANICAL STEERING UNIT WITH INTEGRATED EMERGENCY STEERING CAPABILITY

(75) Inventor: Aaron Kelly Krahn, Eden Prairie, MN (US)

(73) Assignee: Eaton Corporation, Cleveland, OH (US)

( * ) Notice: Subject to any disclaimer, the term of this patent is extended or adjusted under 35 U.S.C. 154(b) by 125 days.

(21) Appl. No.: 13/111,228

(22) Filed: May 19, 2011

(65) Prior Publication Data

US 2011/0297473 A1    Dec. 8, 2011

Related U.S. Application Data

(60) Provisional application No. 61/351,474, filed on Jun. 4, 2010.

(51) Int. Cl.
*B62D 5/06* (2006.01)
*B62D 5/08* (2006.01)
*B62D 5/30* (2006.01)

(52) U.S. Cl. ......... 180/406; 180/405; 180/402; 180/403

(58) Field of Classification Search ................. 180/406, 180/405, 402, 403
See application file for complete search history.

(56) References Cited

U.S. PATENT DOCUMENTS

| | | | |
|---|---|---|---|
| 6,502,661 B1* | 1/2003 | Heitzer | 180/403 |
| 6,575,263 B2 | 6/2003 | Hjelsand et al. | |
| 6,611,415 B1* | 8/2003 | Hagidaira et al. | 361/160 |
| 7,913,801 B2* | 3/2011 | Nakamura et al. | 180/442 |

FOREIGN PATENT DOCUMENTS

| | | |
|---|---|---|
| EP | 1693282 A1 | 8/2006 |
| EP | 1894813 A2 | 5/2008 |
| JP | 2009154769 A | 7/2009 |

* cited by examiner

*Primary Examiner* — Ruth Ilan
*Assistant Examiner* — Marlon Arce
(74) *Attorney, Agent, or Firm* — Quinn Law Group, PLLC

(57) ABSTRACT

A steering system includes a steer-by-wire (SBW) valve, a main steering pump, a steering actuator, and a steering control unit (SCU). The SCU is in fluid communication with the actuator via a pair of fluid conduits, and includes upper and lower portions. The upper portion contains a first solenoid valve and a cross-over check valve assembly. The lower portion contains a fluid control valve. An ECU generates a steering input signal in response to steering wheel rotation, and transmits the signal to the SBW valve. The SCU controls the first solenoid valve to deliver fluid from the lower portion to the actuator via the cross-over valve assembly in an emergency steering mode, and also controls the first solenoid valve to prevent flow into the actuator and allow recirculation of fluid within the lower portion in a torque feel mode.

12 Claims, 2 Drawing Sheets

US 8,397,858 B2

HYDRO-MECHANICAL STEERING UNIT WITH INTEGRATED EMERGENCY STEERING CAPABILITY

CROSS-REFERENCE TO RELATED APPLICATIONS

This application claims the benefit of U.S. Provisional Application 61/351,474, which was filed on Jun. 4, 2010, and which is hereby incorporated by reference in its entirety.

TECHNICAL FIELD

The present disclosure relates to electro-hydraulic valves and steering control methodologies for use with steer-by-wire power steering systems.

BACKGROUND

A typical steer-by-wire power steering system may be hydrostatically or electrically actuated. Either configuration lacks a direct mechanical connection between the steering wheel, which receives a driver's steering command in the form of input steering torque, and the front wheels steered during a given steering maneuver. Steering input torque and steering wheel position signals are processed by an electronic control unit, which in turn generates a steering command signal as an output value. The steering command signal is transmitted to a steer-by-wire valve, which may then control an inlet of fluid to a steering actuator.

Conventional steer-by-wire power steering systems may at times provide a less than optimal steering response or torque "feel", i.e., the torque response perceived by a driver of a vehicle via the steering wheel. Additionally, a reliable supply of electrical energy is essential to the proper functioning of any steer-by-wire system. Therefore, a power failure and/or main steering pump fault can render normal steering assistance temporarily unavailable. Depending on the design of the vehicle, such conditions may render the steering response less than optimal.

SUMMARY

A steering system as disclosed herein provides both emergency power steering functionality and optimal torque feedback or feel to a driver. A steering control unit (SCU) uses a pair of cross-over check valves, for instance spring-biased ball check valves of the type known in the art, and a solenoid valve positioned between the SCU and a steering actuator, for instance a fluid-actuated piston and rod disposed within a cylinder. Under normal driving conditions, rotation of the steering wheel results in generation of an electrical steering input signal by an electronic control unit (ECU). This steering input signal is then relayed to a steer-by-wire (SBW) valve.

The SBW valve conducts fluid from a main steering pump to the steering actuator under normal operating conditions, i.e., when the main steering pump and the SBW are both working properly. However, when the SBW valve or the main steering pump fails, the SCU may be controlled in such as way as to provide emergency or backup power steering. At other times, the SCU may be controlled to provide an optimal level of torque feel or feedback at the steering wheel via a recirculation of fluid within the SCU. Fluid is prevented from reaching the steering actuator from the SCU in the torque feel mode by the cross-over check valve assembly.

In particular, a steering system includes a steering wheel, an SBW valve in electrical communication with the steering wheel, and a main steering pump in fluid communication with the SBW valve. The steering system also includes a steering actuator in fluid communication with the main steering pump via the SBW valve, and an SCU in fluid communication with the steering actuator via a pair of fluid conduits. The SCU includes an upper portion containing a first solenoid valve and a cross-over check valve assembly arranged between the pair of fluid conduits, and a lower portion containing a fluid control valve coupled to the steering wheel. The lower portion is in fluid communication with the steering actuator via the cross-over check valve assembly.

Additionally, the steering system includes an ECU configured for generating a steering input signal in response to a rotation of the steering wheel, and for transmitting the steering signal to the SBW valve to thereby selectively admit fluid to the SBW valve from the main steering pump. The ECU also detects a predetermined condition in which at least one of the SBW valve and the main steering pump has failed, and selectively controls the first solenoid valve to a first state to deliver fluid from the lower portion to the steering actuator via the cross-over valve assembly. This provides an emergency steering mode during the predetermined condition. The ECU also selectively controls the first solenoid valve to one of the first and second states to prevent fluid flow into the steering actuator, and to thereby allow a recirculation of fluid within the lower portion of the SCU. This provides the torque feel mode.

The above features and advantages and other features and advantages of the present invention are readily apparent from the following detailed description of the best modes for carrying out the invention when taken in connection with the accompanying drawings.

DESCRIPTION

Figure 1:
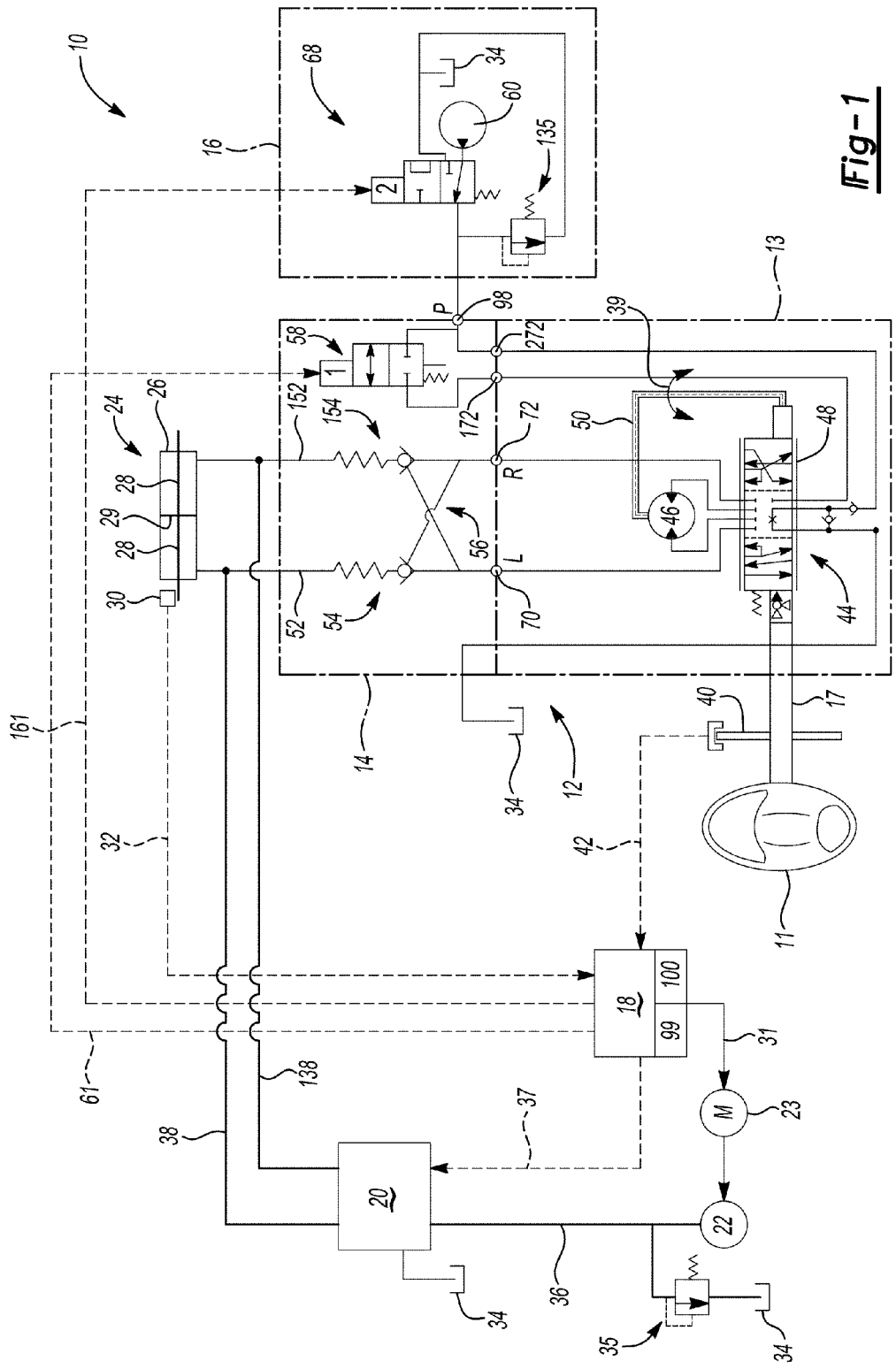
FIG. 1 is a schematic circuit illustration of a steer-by-wire power steering system as disclosed herein.

Referring to the drawings, wherein like reference numbers refer to like components, a steer-by-wire vehicle power steering system 10 is shown schematically in FIG. 1. The steering system 10, as explained in detail below, includes a steering control unit (SCU) 12 having a lower portion 13 and an upper portion 14. The SCU 12 is configured to provide an optimal level of torque "feel", i.e., torque feedback or reaction torque, to a driver of a vehicle having a steering wheel 11, as well as emergency power steering when such capabilities are needed. The present steering system 10 may be particularly useful when used in a steering system of certain types of heavy industrial or agricultural vehicles such as tractors, combines, earth moving equipment, and other relatively heavy vehicles which use a steer-by-wire arrangement.

The steering wheel 11 is connected to a steering column 17. The steering column 17 has a steering input sensor 40 disposed on the steering column 17 or positioned adjacent thereto. The steering input sensor 40 transmits an electrical steering input signal (arrow 42) to an electronic control unit (ECU) 18. The steering input signal (arrow 42) corresponds to the rotational motion of the steering wheel 11, and may include information such as whether or not the steering wheel 11 is presently rotating, the direction of rotation, and the instantaneous speed of rotation.

The ECU 18 may be configured as a digital computer or microcomputer or a vehicle steering control module having a microprocessor/central processing unit (CPU), read-only memory (ROM), random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Instructions or computer-executable code embodying the present method 100 (see FIG. 3) and any required reference calibrations may be stored within or readily accessed by the ECU 18 from tangible, non-transitory memory 99 to provide the functions described below.

The steering system 10 includes a steered wheel actuator assembly 24, as shown schematically at the top of FIG. 1. In an example embodiment, the actuator assembly 24 may include a cylinder 26 containing axially moveable piston rods 28 separated by a piston 29. The piston rods 28 reciprocate left or right in response to admission of fluid pressure into a respective left (L) and right (R) fluid port 70 and 72. The piston rods 28 may extend from the ends of the cylinder 26 as shown. The piston rods 28 are operatively connected to the steered wheels (not shown) using any conventional design, as is well understood in the art. A position sensor 30 senses the linear position of the adjacent piston rod 28 and transmits a wheel position signal (arrow 32) to the ECU 18, with the transmitted position signal (arrow 32) representing or encoding at least the instantaneous steered wheel position.

A main steering pump 22, e.g., a fixed displacement pump, receives fluid from a sump 34, and selectively returns excess fluid to the sump 34, e.g., through a relief valve 35. Sump 34 may be a single location or device, even though the sump 34 is shown in multiple locations in FIG. 1 for illustrative clarity. The main steering pump 22 may be electrically driven by a pump motor (M) 23 in response to motor control signal (arrow 31) from the ECU 18 or another controller. The motor 23 draws electrical power from a battery (not shown) or another suitable electrical source. Alternatively, the main steering pump 22 may be drive by an internal combustion engine (not shown), as is well understood in the art.

The fluid output of the main steering pump 22 is communicated by means of a first fluid conduit 36 to a steer-by-wire (SBW) valve 20, e.g., a proportional control valve such as a three-position, four-way electromagnetically actuated valve. The SBW valve 20 is actuated via valve command signals (arrow 37) from the ECU 18. Under normal driving conditions, for instance when the main steering pump 22 is working properly, the SBW valve 20 supplies fluid to the actuator assembly 24 via second and third fluid conduits 38, 138. However, a failure of the SBW valve 20 and/or the main steering pump 22 may result in a temporary loss of power steering capability in a steer-by-wire system. The SCU 12 is thus configured to provide emergency steering capability in such an instance, as well as optimal torque feel at other designated times.

Still referring to FIG. 1, the present SCU 12 includes a fluid control valve 44, e.g., a multi-port spool and sleeve valve as shown. The fluid control valve 44 is in fluid communication with a gerotor assembly 46. As known in the art, a gerotor assembly is a positive displacement device having a trochoidal inner rotor or star member and an outer rotor formed by a circle with intersecting circular arcs. The fluid control valve 44 is in fluid communication with opposite ends of the cylinder 26 via fourth and fifth fluid conduits 52 and 152, which are parallel to each other as shown, or substantially so. Additional work ports of the fluid control valve 44 are connected to the gerotor assembly 46 as shown.

Under normal driving conditions, a rotation of the steering wheel 11 actuates the fluid control valve 44, which ultimately powers rotation of the gerotor assembly 46. As is well known in the art of hydrostatic steering valves, a gerotor assembly such as the present gerotor assembly 46 may be used to measure a volume of fluid flow passing through the gerotor assembly, thus acting as a type of fluid meter. The gerotor assembly 46 can then transmit a proportional follow-up movement to the fluid control valve 44. More particularly, the follow-up movement may be transmitted to a sleeve 48 of the fluid control valve 44 via a shaft 50. The shaft 50 is in splined engagement with the inner member or star portion of the gerotor assembly 46 to rotate therewith, as indicated by double arrow 39.

Within the present SCU 12, the upper portion 14 includes a cross-over check valve assembly 56 and a first solenoid valve 58, also labeled (1) in FIG. 1 for added clarity. The first solenoid 58 is connected to additional fluid ports 172, 272 of the SCU 12. Fourth and fifth fluid conduits 52 and 152 supply fluid to the actuator assembly 24 from the SCU 12 when needed to provide emergency power steering, with the fluid conduits 52, 152 also in fluid communication with the respective left and right fluid ports 70, 72.

The cross-over check valve assembly 56 includes first and second check valves 54, 154, e.g., conventional spring-biased ball check valves having a valve seat, or other suitable one-way flow valves. The first check valve 54 is positioned in fluid series with the fourth fluid conduit 52. Likewise, the second check valve 154 is in fluid series with the fifth fluid conduit 152. An inlet side of each of the check valves 54 or 154 is fluidly connected to an inlet side of the other check valve 54 or 154. Thus, fluid is allowed to selectively recirculate within the SCU 12 without reaching the actuator assembly 24.

Torque Feel Mode: $1^{st}$ Embodiment

The SCU 12 can provide optimal torque feel to a driver via the steering wheel 11 when not otherwise providing flow to the cylinder 26. In other words, the SCU 12 provides a driver with the feel of actually steering. The SCU 12 remains in this torque feel mode unless there is a power failure or a detected error in the steer-by-wire system 10. In feel mode, the first solenoid valve 58 is activated/opened to allow fluid to freely recirculate within the lower portion 12, with activation of the first solenoid valve 58 occurring in response to a solenoid control signal (arrow 61) from the ECU 18. Torque feel mode may be entered at the end limits or stops of the cylinder 26 by deactivating/closing the first solenoid valve 58 to give a driver the feeling of hitting the end stops of the cylinder 26.

Emergency Steering: $1^{st}$ Embodiment

The first solenoid valve 58 may be automatically de-activated/closed by the ECU 18 via the solenoid control signals (arrow 61), during emergency steering conditions, to allow fluid pressure to develop in the lower portion 13. That is, deactivation of first solenoid valve 58 allows pressure to build by closing the recirculation path, which enables the SCU 12 to steer the cylinder 26. An optional fluid circuit 16 in fluid communication with the upper portion 14 via a control port (P) 98 may include a second solenoid 68, also labeled (2) in FIG. 1 for added clarity, a relief valve 135 configured to limit the max pump pressure, and an auxiliary steering pump 60. The second solenoid 68 may be controlled via solenoid control signals (arrow 161) in response to loss of fluid pressure from the main steering pump 22. When the second solenoid 68 is activated/opened, flow is directed back to the sump 34.

When deactivated/closed, flow is provided to the SCU 12, and ultimately to the cylinder 26 to provide emergency steering.

Therefore, the schematic circuit of FIG. 1 allows for optimized torque feel to the driver at the steering wheel 11 under two conditions: (1) when operating at the stops of the cylinder 26, with first solenoid 58 deactivated, and (2) during normal steering (first solenoid 58 activated) when the SBW valve 20 is actively controlling the cylinder 26. Emergency backup steering may be provided when the SBW valve 20 is inactive, with the first solenoid valve 58 deactivated. The optional second solenoid 68 may be activated/opened during normal driving, and deactivated/closed during the emergency steering state.

Figure 2:
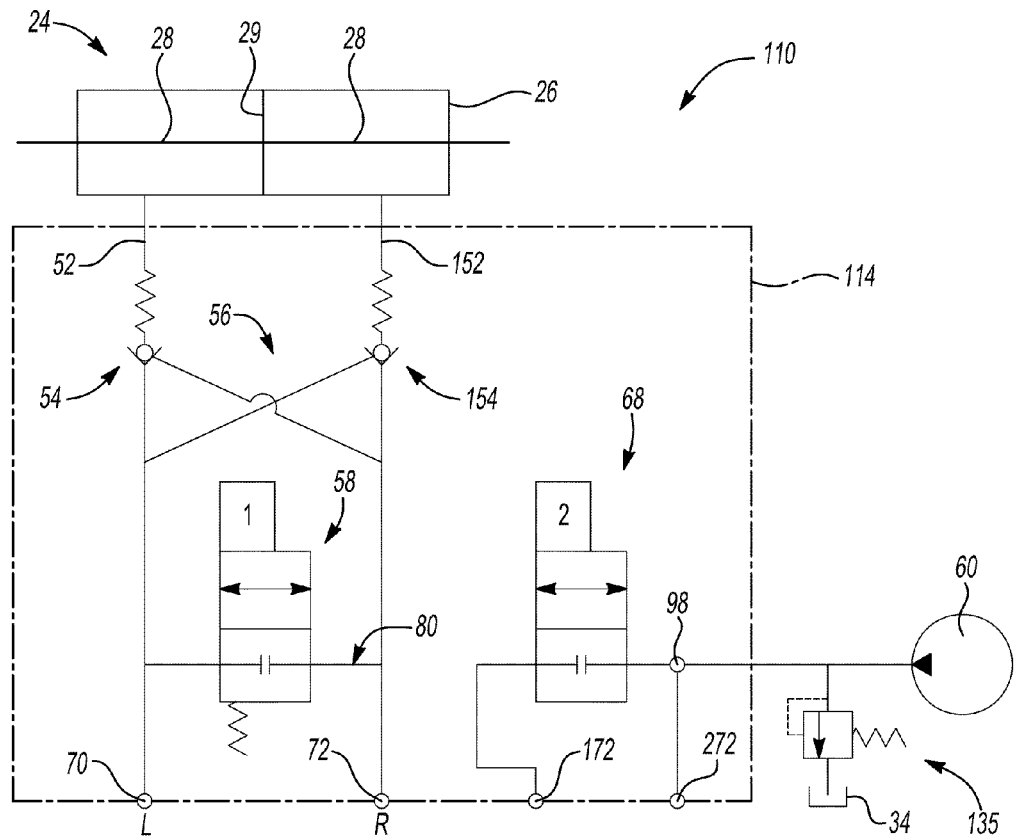
FIG. 2 is a schematic circuit illustration of an alternative embodiment of the steer-by-wire power steering system shown in FIG. 1.

Referring to FIG. 2, an alternative steer-by-wire vehicle power steering system 110 includes a modified upper portion 114. For simplicity, only the upper portion 114 is shown in FIG. 2, with the remaining components of the SCU 12 shown in FIG. 1, i.e., the lower portion 13, steering wheel 11, ECU 18, etc. In this embodiment, the first solenoid 58 is positioned in proximity to the cross-over check valve assembly 56 upstream of the cylinder 26. The check valves 54, 154 are disposed within the respective fourth and fifth fluid conduits 52, 152. A transverse fluid passage 80 connects the fourth fluid conduit 52 with the fifth fluid conduit 152 as shown, with the first solenoid valve 58 disposed within the transverse fluid passage 80.

In the embodiment of FIG. 2, the second solenoid 68 is placed inside of the modified upper portion 114 in fluid communication with the auxiliary steering pump 60, which remains external to the upper portion 114. The second solenoid valve 68 is also in fluid communication with the fluid port 272 on the input/pump side of the second solenoid 68, and with the fluid port 172 on the outlet side of the second solenoid 68.

Torque Feel Mode: $2^{nd}$ Embodiment

In this embodiment, the auxiliary steering pump 60 always supplies fluid to the fluid control valve 44 (see FIG. 1). The second solenoid 68, which is not optional in this embodiment, is fed by the pump 60 via control port 98 and controlled to reduce the volumetric efficiency of the gerotor assembly 46 when needed. For instance, in an emergency steering mode the SCU 12 may have to provide approximately 60 RPM of steering assistance to the steering wheel 11 (see FIG. 1), but the volumetric efficiency of the gerotor assembly 46 must remain near 100%.

During normal operation, the SCU 12 may have to steer the steering wheel 11 at 120 RPM, but no flow is going to the cylinder 26 in this instance. Therefore, reduced volumetric efficiency is not problematic during normal operation. Again, only the feel of actually steering is required. In an example in which the gerotor assembly 46 has a displacement of 50 cc, one may achieve 120 RPM in torque feel mode with the same flow rate needed to reach 60 RPM in the emergency steering mode, i.e., (60)(50 cc)=3 liters per minute (LPM), instead of having to provide 6 LPM of flow for the same 120 RPM in torque feel mode.

The first solenoid 58 is activated/opened in the torque feel mode to recirculate fluid within the SCU 12 of FIG. 1. The second solenoid 68 is activated/opened during normal driving conditions so that some fluid recirculates around the gerotor assembly 46.

A higher RPM input is thus provided to the steering wheel 11 of FIG. 1 with a reduced flow rate, as noted in the above example.

Emergency Steering: $2^{nd}$ Embodiment

During emergency steering conditions, the first solenoid valve 58 is deactivated/closed such that fluid cannot flow through the first solenoid valve 58. In this mode, fluid reaches the cylinder 26 to provide emergency steering capability. Fluid power is provided to the fluid control valve 44, and ultimately to the cylinder 26, via the auxiliary steering pump 60 when the second solenoid valve 68 is likewise deactivated/closed.

Figure 3:
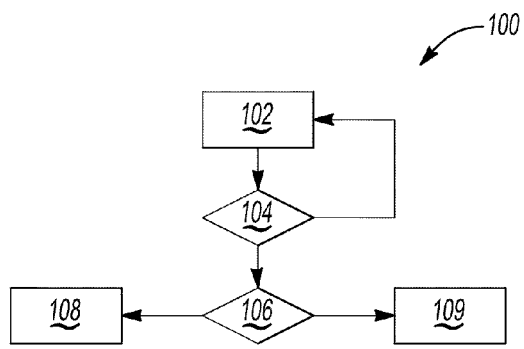
FIG. 3 is a flow chart describing an example method for optimizing the steering performance of a vehicle using the steer-by-wire power steering system of FIG. 1 or 2.

Referring to FIG. 3 in conjunction with the structure of FIGS. 1 and 2, an example of the present method 100 may be used to optimize the power steering of a vehicle using the steering assemblies 10 and 110 of FIGS. 1 and 2, respectively. Beginning with step 102, a vehicle using the present steering system 10, 110 is operating normally, i.e., using the main steering pump 22 and the SBW valve 20 of FIG. 1. The ECU 18 detects various vehicle operating parameters, e.g., the steering input signal (arrow 42), performance characteristics of the main steering pump 22 and SBW valve 20, vehicle speed, wheel position signal (arrow 32), etc. The ECU 18 proceeds to step 104 once these values have been received and processed.

At step 104, the ECU 18 determines whether the values from step 104 correspond to a predetermined steering condition which would benefit from use of the SCU 12, e.g., a torque feel condition/feel mode or, alternatively, an emergency steering condition. For instance, the values from step 102 may indicate that the main steering pump 22 is offline or disabled, such that the SBW valve 20 is unable to provide fluid power to the steering actuator 24. If the ECU 18 detects no such faults, step 102 continues in a loop with step 104. However, if the predetermined steering condition is determined to be present from the step 102 values, the ECU 18 proceeds instead to step 106.

At step 106, the ECU 18 determines if an emergency steering condition is present. If so, the ECU 18 executes step 108. Otherwise, the ECU 18 executes step 109.

At step 108, the ECU 18 transmits a solenoid control signal (arrow 61) to the first solenoid valve 58 to thereby deactivate/close the first solenoid valve 58. When used, the second solenoid valve 68 remains deactivated/closed so as to allow fluid to reach and power the fluid control valve 44.

At step 109, the ECU 18 activates/opens the first solenoid 58 and the second solenoid valve 68. In this manner, some amount of fluid is allowed to circulate to the gerotor assembly 46 to provide the desired amount of torque feel or feedback at the steering wheel 11 as described above.

While the best modes for carrying out the invention have been described in detail, those familiar with the art to which this invention relates will recognize various alternative designs and embodiments for practicing the invention within the scope of the appended claims.

The invention claimed is:

1. A steering system comprising:

a steering wheel;

a steer-by-wire (SBW) valve in electrical communication with the steering wheel;

a main steering pump in fluid communication with the SBW valve;

a steering actuator in fluid communication with the main steering pump via the SBW valve;

a steering control unit (SCU) in fluid communication with the steering actuator via a pair of fluid conduits, and having:

an upper portion containing a first solenoid valve and a cross-over check valve assembly arranged between the pair of fluid conduits; and a lower portion containing a fluid control valve coupled to the steering wheel, and in fluid communication with the steering actuator via the cross-over check valve assembly; and an electronic control unit (ECU) configured for:
generating a steering input signal in response to a rotation of the steering wheel;
transmitting the steering signal input to the SBW valve to thereby selectively admit fluid to the SBW valve from the main steering pump;
determining a predetermined condition in which at least one of the SBW valve and the main steering pump has failed;
selectively controlling the first solenoid valve to a first state to deliver fluid from the lower portion of the SCU to the steering actuator via the cross-over valve assembly, and to thereby provide an emergency steering mode during the predetermined condition; and
selectively controlling the first solenoid valve to one of the first state and a second state to thereby prevent fluid flow into the steering actuator, and to allow a recirculation of fluid within the lower portion of the SCU, thereby providing a torque feel mode.

2. The steering system of claim 1, wherein the steering actuator is a fluid-actuated piston and a pair of piston rods disposed within a steering cylinder.

3. The steering system of claim 1, wherein the SBW valve is a three-position, four-way proportional control valve.

4. The steering system of claim 1, wherein the fluid control valve is a multi-port spool and sleeve, and wherein the lower portion includes a gerotor assembly in fluid communication with the fluid control valve.

5. The steering system of claim 1, further comprising an auxiliary steering pump and a second solenoid control valve, wherein the second solenoid valve is selectively deactivated/closed by the ECU during the predetermined condition to thereby fluidly connect the auxiliary steering pump to the SCU.

6. The steering system of claim 1, wherein:
the steering actuator is in fluid communication with the lower portion via a pair of fluid conduits having a transverse fluid passage connecting the pair of fluid conditions;
the cross-over valve assembly is in fluid series with the pair of fluid conduits; and
the first solenoid valve is positioned within the transverse fluid passage.

7. A steering control unit (SCU) for use in a steering system having a steer-by-wire (SBW) valve configured for delivering fluid from a main steering pump to a steering actuator in response to an electric steering input signal from an electronic control unit (ECU), the SCU comprising:
an upper portion containing a first solenoid valve and a cross-over check valve assembly arranged between a pair of fluid conduits; and
a lower portion containing a fluid control valve coupled to the steering wheel, and in fluid communication with the steering actuator via the cross-over check valve assembly;
wherein the first solenoid valve is configured to shift to a first state during a predetermined condition in which at least one of the SBW valve and the main steering pump has failed, thereby delivering fluid from the lower portion to the steering actuator to provide an emergency steering mode during the predetermined condition; and
wherein the first solenoid valve is configured to shift to one of the first state and a second state to thereby provide an optimal torque feel mode by recirculating fluid within the lower portion of the SCU and preventing fluid from being delivered to the steering actuator.

8. The SCU of claim 7, wherein the SBW valve is a three-position, four-way proportional control valve.

9. The SCU of claim 7, wherein the fluid control valve is a multi-port spool and sleeve, and wherein the lower portion includes a gerotor assembly in fluid communication with the fluid control valve.

10. The SCU of claim 7, further comprising a second solenoid control valve in fluid communication with an auxiliary steering pump, wherein the second solenoid valve is selectively deactivated/closed by the ECU in the predetermined condition to thereby connect the auxiliary steering pump to the SCU.

11. The SCU of claim 7, wherein:
the lower portion is in fluid communication with the steering actuator via the pair of fluid conduits;
the lower portion further includes a transverse fluid passage connecting the pair of fluid conduits;
the cross-over valve assembly is positioned in fluid series with the pair of fluid conduits; and
the first solenoid valve is positioned within the transverse fluid passage.

12. A steering control unit (SCU) for use in a steering system having a steer-by-wire (SBW) control valve configured for delivering fluid from a main steering pump to a cylinder of a piston-type steering actuator in response to an electric steering input signal from an electronic control unit (ECU), the SCU comprising:
an upper portion containing a first solenoid valve and a cross-over check valve assembly arranged between a pair of substantially parallel fluid conduits, wherein the cross-over check valve assembly includes a pair of spring-biased ball check valves each disposed within a different one of the substantially parallel fluid conduits, such that an inlet side of each of the check valves is fluidly connected to an inlet side of the other check valve; and
a lower portion having a multi-port spool and sleeve-type fluid control valve coupled to the steering wheel, and also having a gerotor assembly in fluid communication with the fluid control valve, wherein the lower portion is in fluid communication with:
a solenoid-controlled auxiliary steering pump; and
with the cylinder via the cross-over check valve assembly and the pair of substantially parallel fluid conduits;
wherein:
the first solenoid valve is configured to shift to a first state during a predetermined condition in which at least one of the SBW valve and the main steering pump has failed, thereby delivering fluid from the lower portion to the cylinder to provide an emergency steering mode during the predetermined condition; and
the first solenoid valve is configured to shift to one of the first state and a second state to thereby provide an optimal torque feel mode by recirculating fluid within the lower portion of the SCU, and by preventing fluid from being delivered to the steering actuator.

* * * * *